US011005275B2

(12) United States Patent
Bober et al.

(10) Patent No.: US 11,005,275 B2
(45) Date of Patent: May 11, 2021

(54) INTELLIGENT CHARGING USB SPLITTER

(71) Applicants: Wieslaw Bober, Astoria, NY (US); Kamil Sienkiel, Wegrzce (PL); Dominik Stanislaw Sienkiel, Ostrowiec Swietokrzyski (PL)

(72) Inventors: Wieslaw Bober, Astoria, NY (US); Kamil Sienkiel, Wegrzce (PL); Dominik Stanislaw Sienkiel, Ostrowiec Swietokrzyski (PL)

(73) Assignee: WBTEC, LLC, Hopewell Junction, NY (US)

( * ) Notice: Subject to any disclaimer, the term of this patent is extended or adjusted under 35 U.S.C. 154(b) by 260 days.

(21) Appl. No.: 16/185,981

(22) Filed: Nov. 9, 2018

(65) Prior Publication Data
US 2019/0237977 A1 Aug. 1, 2019

Related U.S. Application Data

(60) Provisional application No. 62/645,591, filed on Mar. 20, 2018, provisional application No. 62/622,602, filed on Jan. 26, 2018, provisional application No. 62/622,606, filed on Jan. 26, 2018.

(51) Int. Cl.
H01M 10/46 (2006.01)
H02J 7/00 (2006.01)
H02J 7/02 (2016.01)
G06F 13/42 (2006.01)
H01R 13/717 (2006.01)
H01R 13/66 (2006.01)
H01R 31/02 (2006.01)

(52) U.S. Cl.
CPC ........ *H02J 7/0021* (2013.01); *G06F 13/4282* (2013.01); *H01R 13/665* (2013.01); *H01R 13/7175* (2013.01); *H01R 31/02* (2013.01); *H02J 7/025* (2013.01)

(58) Field of Classification Search
CPC ...... H02J 7/00302; H02J 7/0026; H02J 7/025; H02J 50/10; H01R 31/02; H01R 13/70; H01R 13/665; H01R 13/7175
USPC .......... 320/107, 108, 114, 115, 116, 132, 149
See application file for complete search history.

(56) References Cited

U.S. PATENT DOCUMENTS

| 2014/0091623 | A1 | 4/2014 | Shippy et al. |
| 2015/0249343 | A1 | 9/2015 | Makwinski et al. |
| 2016/0233711 | A1* | 8/2016 | Miller ..................... H02J 7/027 |
| 2016/0294209 | A1 | 10/2016 | Miller et al. |

(Continued)

FOREIGN PATENT DOCUMENTS

WO    WO 2014/066990    5/2014

OTHER PUBLICATIONS

International Search Report dated May 15, 2019 issued in counterpart application No. PCT/US2019/015457, 10 pages.

*Primary Examiner* — Edward Tso
(74) *Attorney, Agent, or Firm* — The Farrell Law Firm, P.C.

(57) ABSTRACT

A smart charging solution is provided. The smart charging solution includes a power supply, a power line connected to the power supply and at least one universal serial bus (USB) splitter module and/or wireless charging module. The smart charging solution further includes a cable compensation integrated circuit (IC) for improved output voltage stabilization and a locking mechanism for furniture installation.

18 Claims, 22 Drawing Sheets

(56) References Cited

U.S. PATENT DOCUMENTS

2017/0033566 A1     2/2017   Jursch
2017/0093190 A1*    3/2017   Miller .................. H02J 7/0042
2018/0166894 A1*    6/2018   Miller .................. G06F 1/1632

* cited by examiner d2>d1

INTELLIGENT CHARGING USB SPLITTER

PRIORITY

This application is based on and claims priority under 35 U.S.C. § 119 to U.S. Provisional Application No. 62/645,591, filed on Mar. 20, 2018, in the United States Patent and Trademark Office, U.S. Provisional Application No. 62/622,602, filed on Jan. 26, 2018, in the United States Patent and Trademark Office, and U.S. Provisional Application No. 62/622,606, filed on Jan. 26, 2018, in the United States Patent and Trademark Office, the disclosures of which are incorporated herein by reference in its entirety.

BACKGROUND

1. Field of the Disclosure

The present disclosure relates generally to charging electronic devices, and more particularly, using furniture to charge electronic devices, both through a wire and wirelessly.

2. Description of the Related Art

Due to the different furniture sizes and various layouts in or on homes, RV vehicles, and yachts, there is a need for different lengths of intelligent charging extensions with a variety of built-in features that will allow for the transfer of appropriate voltages, amperages (amps), and power to electronic devices (i.e., smart phones and smart tablets) over a distance in order to charge them with the same speed as the speed provided by factory chargers.

Further, locating fast, reliable, and available charging solutions has become problematic as the number of portable electronic devices has increased in recent years.

Additionally, low quality charging solutions may damage portable electronic devices and their batteries. Low quality charging solutions may distribute imprecise voltage and current values for charging portable electronic devices, especially when a power input source is far from where the power is ultimately output to an electronic device because the length of a cable may affect resistance in a power charging solution.

When imprecise voltage and current values are provided to electronic devices, the batteries may experience overcharging or undercharging, which in turn may deteriorate batteries' power efficiency. In other cases, when the power provided to a battery during charging is imprecise, the battery may continuously detect, not detect, detect, not detect, etc. power being input, which may increase the battery's charge cycle count and further deteriorate the battery's power efficiency.

SUMMARY

The present disclosure has been made to address at least the above-mentioned problems and/or disadvantages and provide at least the advantages described below.

An aspect of the present disclosure is directed to a smart charging system including a power supply with a cable compensation integrated circuit (IC) and a power line connected to the power supply and configured to transmit power to at least one universal serial bus (USB) splitter module. Each of the at least one USB splitter modules may include a USB port, a direct current (DC)/DC converted, and a custom IC for fast charging and long term preservation of battery life.

Another aspect of the present disclosure provides a wireless charging device. The wireless charging device may include a USB charging splitter with a power supply featuring a built-in IC for cable compensation, a locking mechanism, and a USB extension with a built-in IC for fast charging and long term preservation of battery life.

According to an aspect of the present disclosure, a smart charging system includes a power supply including a cable compensation IC; and a power line connected to the power supply and configured to transmit power to a plurality of splitter modules. At least a first one of the plurality of splitter modules includes a USB port and a custom IC configured for fast charging and long term preservation of battery life, and at least a second one of the plurality of splitter modules includes a wireless charger and a custom IC configured for fast charging and long term preservation of battery life. The plurality of splitter modules perform cable compensation by communicating information to each other regarding current output charging information to determine an optimal output voltage level for each of the plurality of splitter modules and adjust an output voltage for charging based on the determination.

BRIEF DESCRIPTION OF THE DRAWINGS

Various aspects, features and advantages of the present disclosure will become more apparent from the following detailed description when taken in conjunction with the accompanying drawings, in which.

DETAILED DESCRIPTION

Embodiments of the present disclosure are directed to providing a charger for an electronic device, and are described in detail with reference to the accompanying drawings. Detailed descriptions of constructions or processes known in the art may be omitted to avoid obscuring the subject matter of the present disclosure.

The same numbering is used to correspond to similar elements appearing in multiple figures. The descriptions of similar elements are omitted when those elements have already been described with respect to a previous figure.

Figure 1:
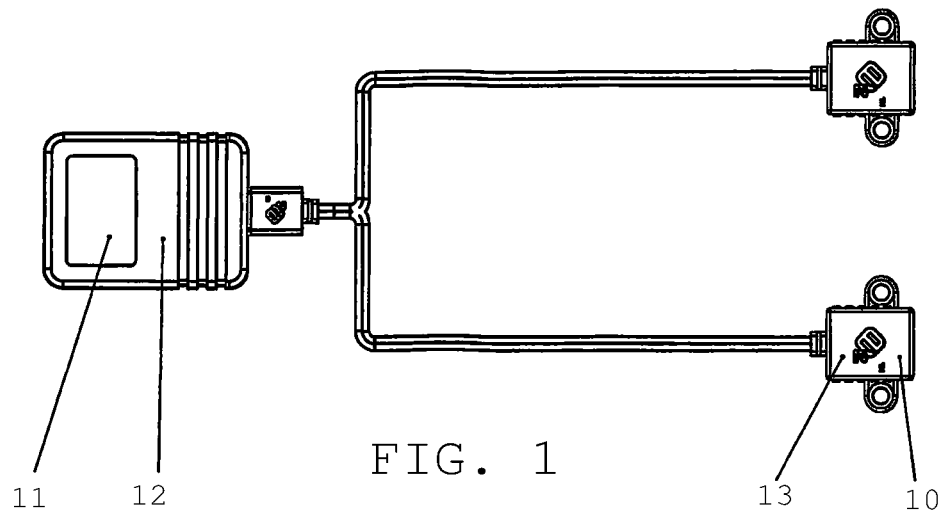
FIG. 1 shows a diagram illustrating a smart charging solution, according to an embodiment of the present disclosure.

Referring initially to FIG. 1, a diagram illustrating a smart charging solution is provided, according to an embodiment of the present disclosure.

The smart charging solution of FIG. 1 includes a power supply 11 housed with a cable compensation integrated circuit (IC) 12. The smart charging solution includes a 1.5 to 2 meter intelligent charging USB splitter/extension 13. The smart charging solution further includes a smart USB port 10.

Additionally, the smart charging solution may include a custom IC that allows the entire device to communicate with an external IC (i.e., a main phone chip responsible for charging, safety and battery life of a smart phone). For example, the custom IC may be positioned inside the smart USB splitter/extension 13 near the smart USB port 10 and communicate with an external IC (i.e., an IC of a device that is being charged through the USB port 10, such as a mobile phone or tablet). The external IC may instruct and/or control a charging procedure so as to prevent damage while charging. For example, the external IC may provide charging specifications (i.e., voltage, power, amperage levels) to the custom IC during charging.

Additionally, the external IC may provide a first set of charging specifications to the custom IC during charging, and then provide a second set of charging specifications to the custom IC during charging after providing the first set of charging specifications. In this way, the external IC may provide real-time charging specifications to the custom IC so as to optimally regulate rapid charging in a safe manner.

Additionally, the external IC (i.e., the main phone chip) may communicate diagnostic information (i.e., preferred, or factory, charging specifications and protocols) based on the type of electronic device (i.e., according to brand or type of battery) to the custom IC of the smart charging solution so that a smart USB port 10 of the smart charging solution outputs an optimal charging power level for an efficient and desirable charge according to the external IC.

The custom IC may include a large variety of standards and protocols to communicate with many different types of electronic devices. For instance, when a first type of electronic device is connected to the smart USB port 10, the custom IC may identify the type of electronic device by communicating with the external IC of the first electronic device and determine a first output power for charging. When a second type of electronic device is connected to the smart USB port 10, the custom IC may identify the type of electronic device by communicating with the external IC of the second electronic device and determine a second output power for charging.

Additionally, the custom IC may prioritize charging. For instance, when a first type of electronic device requires a relatively large power usage for charging when compared to a second type device, then the custom IC may distribute power in a way to ensure that both devices are charged according to their factory specifications. This may mean that the lower power usage device (i.e., the second type device) may first be charged completely and the higher power usage device may be charged after the lower power usage device is finished charging.

Figure 2A:
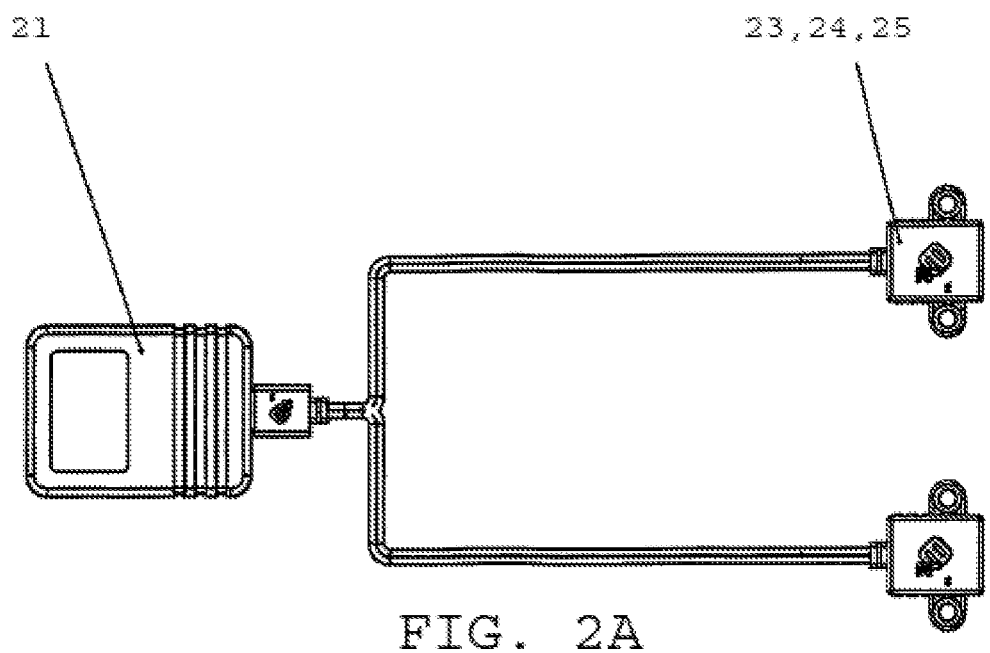
FIG. 2A shows a diagram illustrating a smart charging solution, according to an embodiment of the present disclosure.
Figure 2B:
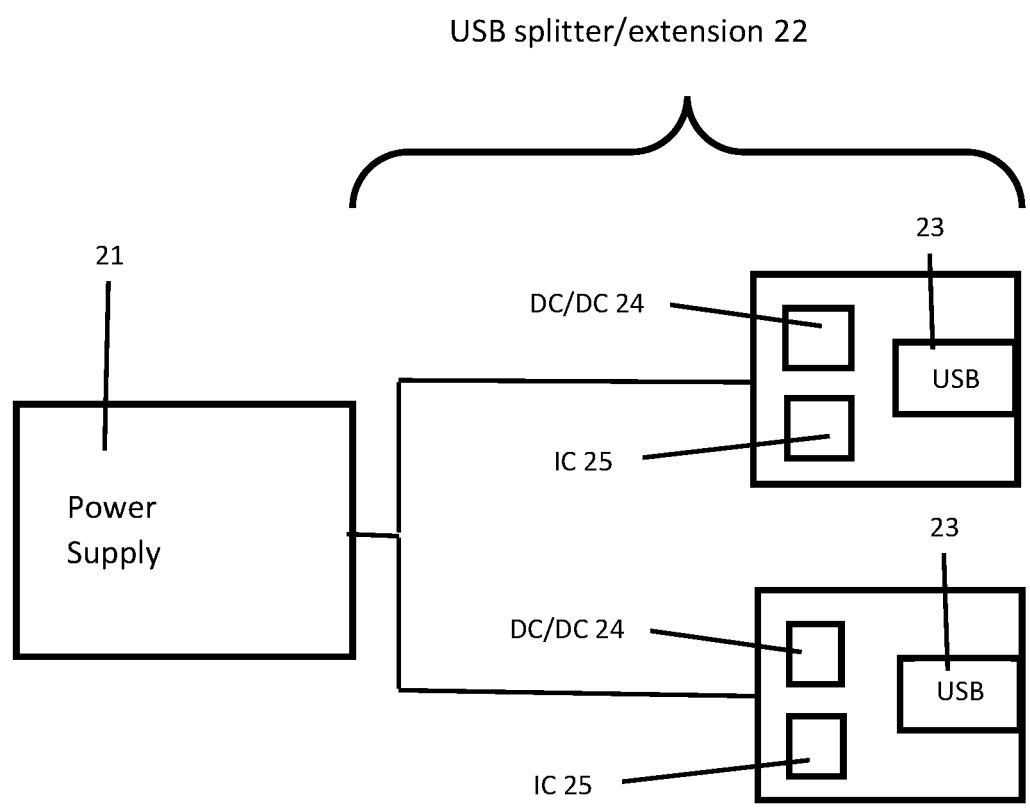
FIG. 2B shows a block diagram illustrating a smart charging solution, according to an embodiment of the present disclosure.

Referring to FIGS. 2A-2B, diagrams illustrating a smart charging solution are provided, according to an embodiment of the present disclosure.

The smart charging solution of FIGS. 2A-2B includes a power supply 21 attached to a 3 to 15 meter USB splitter/extension 22 connected to a USB port 23. The USB port 23 is a part of the USB splitter/extension 22. Additionally, the smart charging solution includes a direct current (DC)/DC converter 24 and a custom IC 25 allowing communication with the main smart phone/tablet control IC located in an external device to be charged that is responsible for fast and safe charging, as well as long term smart phone/tablet battery life.

When the USB splitter/extension 22 extends a long length (i.e., more than 3 meters) from power supply 21, then it becomes more difficult to charge an output device in the most efficient manner because a resistance caused by the length of a cord may interfere with an intended output voltage and current (i.e., power). For example, the relatively long length of the USB splitter/extension may cause a power charging signal to be affected by the length of the transmission (i.e., 3-15 meters). In this case, the USB splitter/extension 22 may use DC/DC converter 24 and custom IC 25 to regulate the output voltage to the USB port 23 to ensure that the output voltage is within the most ideal range for fast and safe charging.

For instance, the power supplied by the power supply 21 may be of a relatively high voltage level (i.e., 24V), and the DC/DC converter 24 may reduce the voltage to a relatively low voltage level (i.e., 5V) prior to outputting voltage to the USB port 23. The DC/DC converter may be a step-down (i.e., buck) voltage converter or a transformer. For example, the DC/DC converter 24 may be capable of receiving a 9V input and outputting 3 watts, 5 watts, and/or 10 watts, according to a power level determined by the custom IC 25 in communication with an external IC (i.e., a main chip of a mobile phone).

Figure 3A:
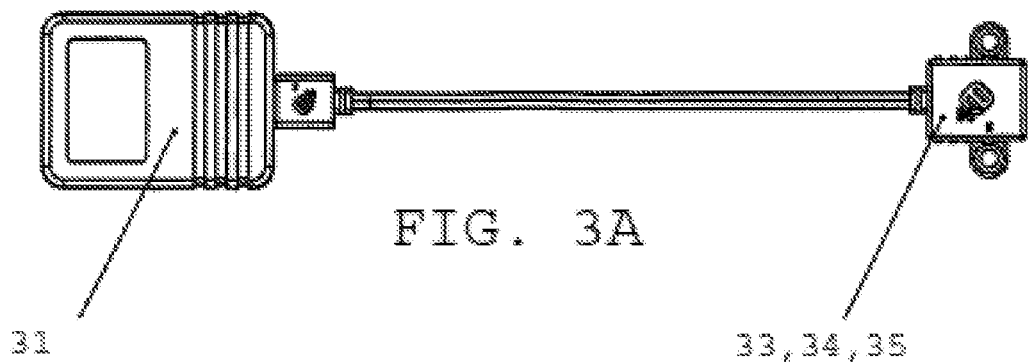
FIG. 3A shows a diagram illustrating a smart charging solution, according to an embodiment of the present disclosure.
Figure 3B:
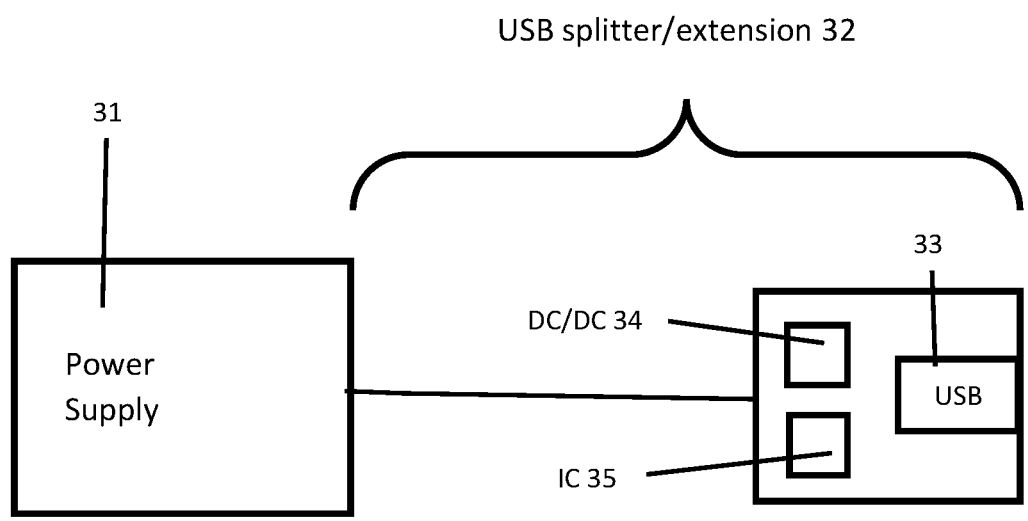
FIG. 3B shows a block diagram illustrating a smart charging solution, according to an embodiment of the present disclosure.

Referring to FIGS. 3A-3B, diagrams illustrating a smart charging solution are provided, according to an embodiment of the present disclosure.

The smart charging solution of FIGS. 3A-3B is substantially similar to the smart charging solution to FIGS. 3A-3B, except that the smart charging solution of FIGS. 3A-3B is provided with an extension without a splitter, whereas the smart charging solution of FIGS. 2A-2B includes an extension with a splitter.

The smart charging solution of FIGS. 3A-3B includes a power supply 31, a USB splitter/extension 32, a USB port 33, a DC/DC converter 34, and a custom IC 35. Like the smart charging solution of FIGS. 2A-2B, the smart charging solution of FIGS. 3A-3B is also capable of providing optimum charging over long distances (i.e., 3-15 meters).

Figure 4A:
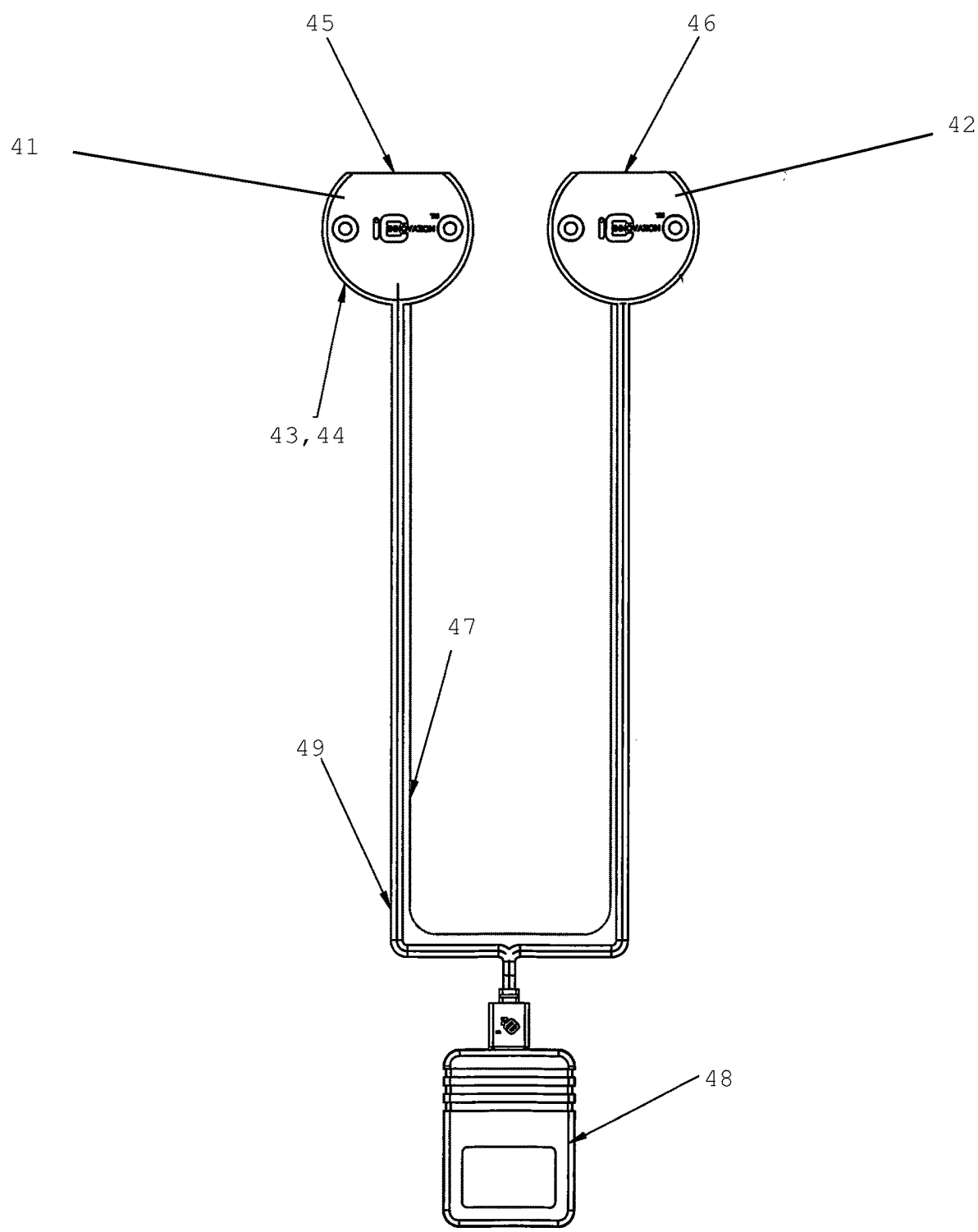
FIG. 4A shows a diagram illustrating a splitter system with a special data line for connecting different types of splitters, according to an embodiment of the present disclosure.
Figure 4B:
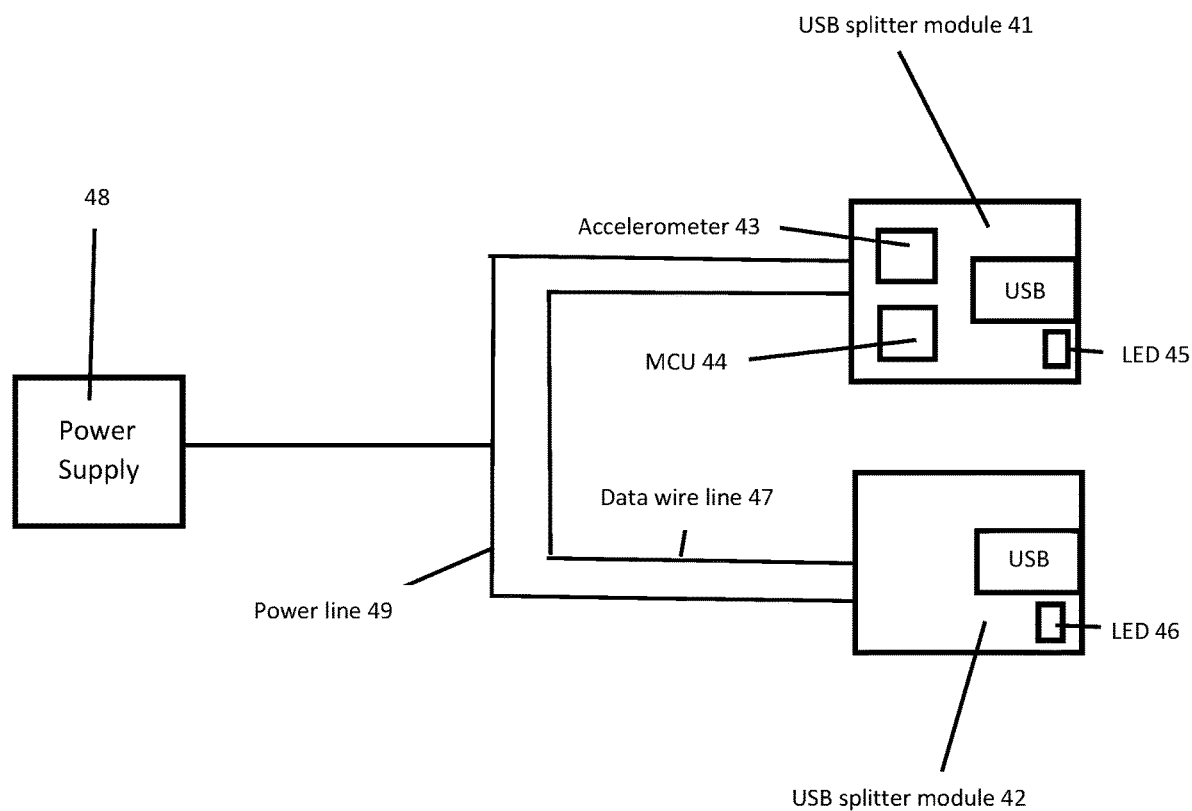
FIG. 4B shows a block diagram illustrating a splitter system with a special data line for connecting different types of splitters, according to an embodiment of the present disclosure.

Referring to FIGS. 4A-4B, diagrams illustrating a splitter system with a special data line for connecting different types of splitters are provided, according to an embodiment of the present disclosure.

A splitter system consists of two separate USB splitter modules 41 and 42. At least one of the USB splitter modules 41 may have a built-in complex system including an accelerometer 43 and/or an 8-bit microcontroller (MCU) 44. Both USB splitter modules 41 and 42 may have a custom IC to regulate the output voltage to the USB port.

The accelerometer 43 may detect vibrations, movement, and acceleration forces along the X, Y, and Z axes. The MCU 44 may be programmed with algorithms that compute values of the accelerations along the X, Y, and Z axes to indicate movement.

The first and second USB modules 41 and 42 may be equipped with light emitting diode (LED) lights 45 and 46, respectively, which may only be turned on or off according to the first USB splitter module 41 having the built-in accelerometer 43 and/or MCU 44, and not the second USB splitter module 42. For example, the USB splitter module 41 having the accelerometer 43 and/or 8-bit MCU 44 may detect motion and turn on both LED lights 45 and 46 using the data wire line 47 to communicate an LED light behavior signal to the USB splitter module 42. Alternatively, the LED lights 45 and 46 may be turned on or off by both USB splitter modules 41 and 42 if both are equipped with accelerometers and/or MCUs.

In the case in which the LED lights 45 and 46 are only able to be turned on or off by the first USB splitter module 41, the other USB modules (i.e., the second USB splitter module 42) may not be equipped with an accelerometer or other complex systems capable of controlling when to turn on or off the LED lights 45 and 46. For example, the second USB splitter module 42 may be equipped with a printed circuit board (PCB) and not an MCU.

Additionally or alternatively, the first USB splitter module 41 may be equipped with a "mother PCB" (i.e., a full or enhanced PCB) and the second USB splitter module 42 may be equipped with a "daughter PCB" (i.e., a relatively simple PCB). Accordingly, the accelerometer 43 and/or 8-bit MCU 44 of the first USB splitter module 41 may detect (i.e. through shaking or touch) an input and control the LED lights 45 and 46 to turn on or off. Conversely, the second USB splitter module 41 may have a limited capability to detect and control the LED lights 45 and 46 to turn on or off.

Additionally or alternatively, it may not be necessary to use an accelerometer 43 to toggle on/off the LED lights 45 and 46. For example, a motion detector can be used in the USB splitter module 41 to detect movement. The motion detector can be affixed to various parts of the splitter system to detect optical, acoustical, or electrical signals. Changes in the optical, microwave, or acoustic field in the sensor's proximity may be interpreted as motion to toggle on/off the LED lights 45 and 46. Thus, a user may easily locate a USB port by being detected by the motion sensor and toggling on/off an LED light 45 and/or 46 located on USB splitter module 41 and/or 42.

USB splitter modules 41 and 42 may exchange data through data wire line 47. Data wire line 47 may have a 30 American wire gauge (AWG) core and be used only to transmit data between USB splitter modules 41 and 42 without transmitting data to an external device. The data wire line 47 can send different types of information between the two or more USB splitter modules 41 and 42 connected to the one power supply 48. For example, the data wire line 47 may propagate one or more signals from the MCU 44 to turn on or off LED lights 45 and 46. Further, the data wire line 47 may send information received though the USB ports regarding a charging specification of external electronic devices connected to the USB ports. This information can be used by the custom IC to determine an appropriate power output level for fast and reliable charging of the external devices.

Additionally, a power line 49 separate from the data wire line 47 may deliver power from the power supply 48 to the first and second USB splitter modules 41 and 42. The power line 49, which is connected between the power supply 48 to USB splitter module 41 and USB splitter module 42 may be a 2×20 AWG wire.

Figure 5:
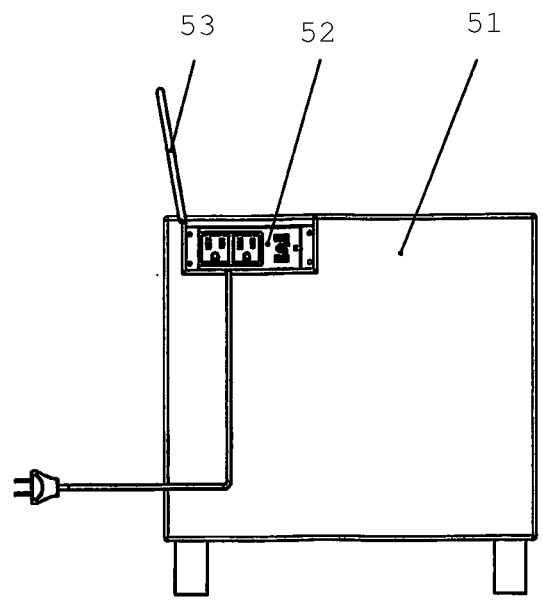
FIG. 5 shows a diagram illustrating a piece of furniture having a permanent factory installation of a universal serial bus (USB) port with an electrical outlet, according to an embodiment of the present disclosure.

Referring to FIG. 5, a diagram illustrating a permanent factory installation of a USB port with an electrical outlet is provided, according to an embodiment of the present disclosure.

A small piece of furniture, such as a nightstand 51, with a factory built-in USB port is provided. The nightstand 51 includes an outlet 52 having a double USB port with a double 110V electrical outlet. The nightstand 51 also includes a removable cover 53 that covers the outlet 52 having the double USB port with the double 110V electrical outlet. The outlet 52 having a double USB port with a double 110V electrical outlet may comply with Level VI efficiency standards to adhere to the requirements of various regulatory agencies and other governing bodies.

Figure 6:
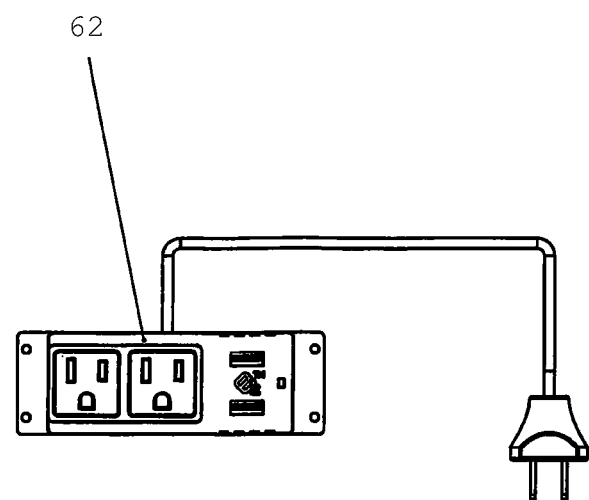
FIG. 6 shows a diagram illustrating the USB port with the electrical outlet of FIG. 5, according to an embodiment of the present disclosure.

FIG. 6 shows a diagram illustrating the USB port with the electrical outlet 52 of FIG. 5, according to an embodiment of the present disclosure. As can be seen in FIG. 6, the electrical outlet 62 has a user-friendly interface that may provide charging to a plurality of devices.

Although the nightstand attached with the USB port may be convenient to a customer for charging electronic devices, there is also a high risk that the customer will return the whole furniture set with the USB charger in the case of unsatisfactory performance or a defect of only the USB charger. Thus, it is advantageous to provide a separate, detachable electrical outlet 62 with a USB charger. In the case of a defect, a customer only needs to return the separate detachable electrical outlet 62, rather than return the entire furniture piece 51.

Figure 7:
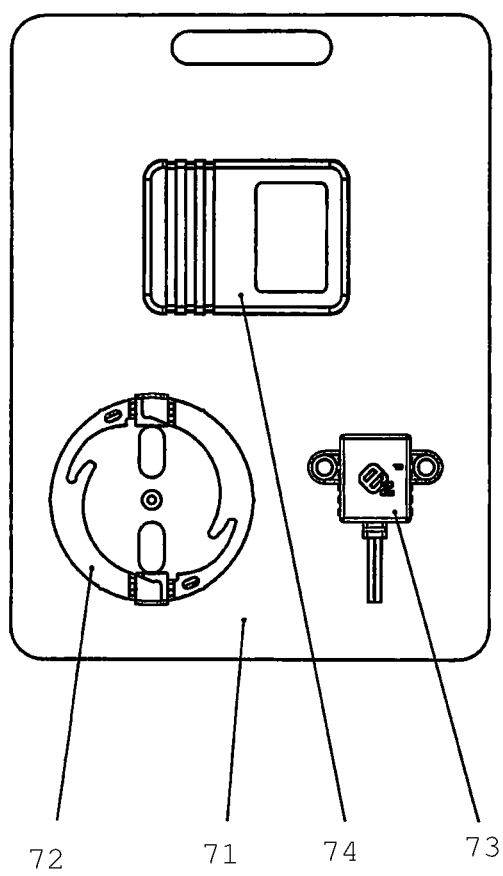
FIG. 7 shows a diagram illustrating a package containing a wireless charging device, according to an embodiment of the present disclosure.

Referring to FIG. 7, a diagram illustrating a package containing a wireless charging device is provided, according to an embodiment of the present disclosure.

The wireless charging device of FIG. 7 may be provided in blister (i.e., separate, individually wrapped) packaging 71. The packaging 71 may include a wireless and USB charging splitter with a power supply 74 (i.e., a wireless charger). The wireless charger may include a locking mechanism assembly 72 and a USB extension 73 with a built-in IC. The power supply 74 may have a wire that is connected to both the USB extension 73 and the locking mechanism assembly 72 having the wireless charger. The fast and safe charging may be performed by the USB extension 73 and/or the wireless charger including the locking mechanism 72 by performing charging according to factory charging capabilities for a given device. The charger may further include a built-in IC configured to perform cable compensation over greater distances.

The locking mechanism assembly 72 may include a wireless charger (i.e., a coil for electromagnetic induction) located within. The coil may be wound around a central point for generating an electromagnetic field. The power supply 74 may simultaneously provide power to the locking mechanism assembly 72 to wirelessly charge a first device, and to the USB extension 73 to charge a device through a USB wire.

Split wireless/USB charging devices in blister packages, as illustrated in FIG. 7, may be sold individually to allow a customer to make an installation decision about the installation of the charging device into custom furniture made by a furniture factory. For example, a wireless/USB charging device may be replaced without replacing the furniture itself in its entirety.

Figure 8:
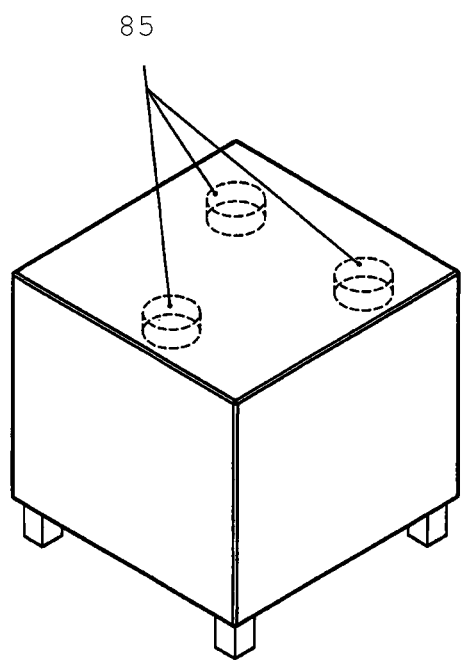
FIG. 8 shows a diagram illustrating a piece of furniture incorporating a wireless charging device, according to an embodiment of the present disclosure.

Referring to FIG. 8, a diagram illustrating furniture for a wireless charging device is provided, according to an embodiment of the present disclosure.

The furniture for the wireless charging device may contain pre-bored holes 85, which may be custom-made by a furniture factory. The holes 85 may be located on the bottom of or on the top of furniture to accommodate the wireless charging device of FIG. 7. For example, a wireless charging device having a locking mechanism 72 may be placed into one of the holes 85 and placed into a locked position such that an edge of the furniture is flush. Additionally, a furniture cover may be placed over the locking mechanism 72 placed in the hole 85.

Figure 9:
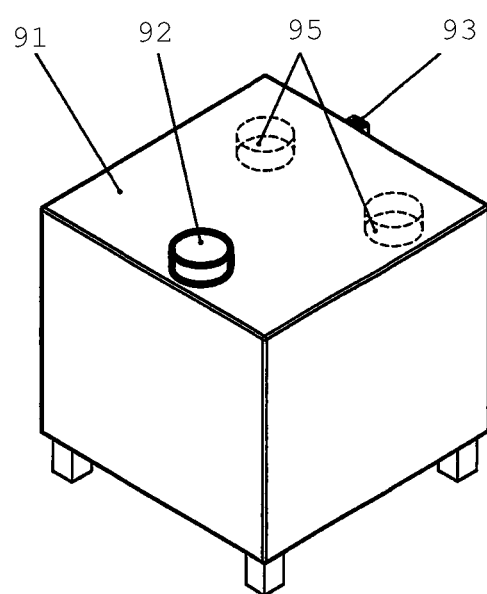
FIG. 9 shows a diagram illustrating a piece of furniture and a wireless charging device installed by a customer, according to an embodiment of the present disclosure.

Referring to FIG. 9, a diagram illustrating a furniture and wireless charging device installed by a customer is provided, according to an embodiment of the present disclosure.

A nightstand 91 with a wireless charger and USB extension may be provided. The nightstand 91 may include a wireless splitter/extension 92 and an intelligent USB splitter/extension 93. Specifically, the intelligent USB splitter/extension 93 may be mounted, or placed, on a side of the nightstand 91 while the wireless splitter/extension 92 may be accommodated in one of the pre-bored holes 95. The intelligent USB splitter/extension 93 and the wireless splitter/extension 92 may simultaneously charge a plurality of external electronic devices (i.e., simultaneously wirelessly charging a mobile device and charging a tablet device through a wire). The pre-bored holes 95 may be custom-made by a furniture factory to accommodate the charging device of FIG. 7.

Part or all of the wireless charging splitter/extension 92 may be included in a wireless charger mounting mechanism and placed in a locked or unlocked position. For example, when the wireless charging splitter/extension 92 is placed into a pre-bored hole, a customer may then lock the wireless charging splitter/extension into place to affix the wireless charging splitter/extension to the furniture. When it is desirable to remove the wireless charging splitter/extension, a customer may unlock the wireless charging splitter/extension to remove it from the furniture.

Accordingly, this solution allows the customer to make an installation decision regarding whether or not to install the charging devices in his/her custom-made furniture. This solution of separately packaged and sold units with installation by the end-user reduces the risk of returning expensive furniture due to unsatisfactory performance of charging devices. A cover (or plug) may be provided for unused bore holes 95.

Figure 10:
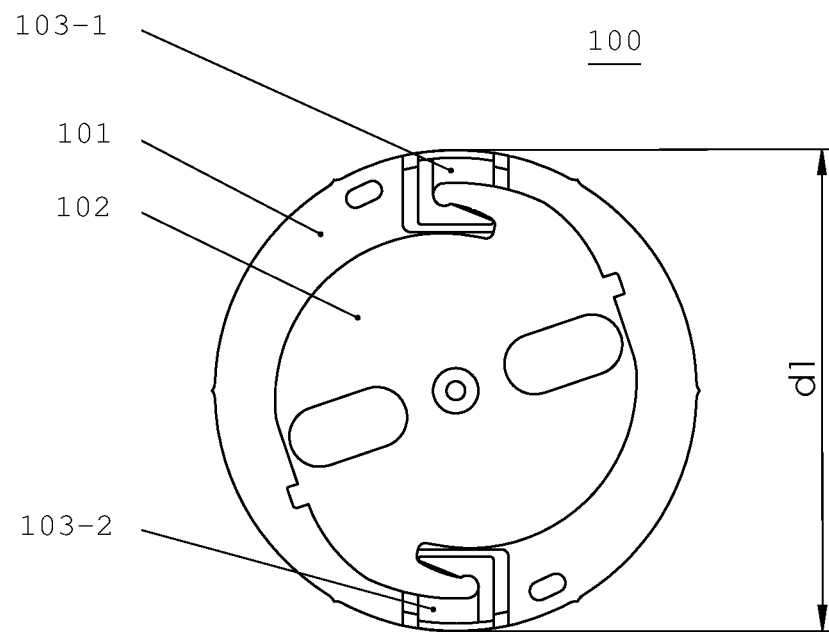
FIG. 10 shows a diagram illustrating an unlocked position for a wireless charger mounting mechanism, according to an embodiment of the present disclosure.

Referring to FIG. 10, a diagram illustrating an unlocked position (configuration) for a wireless charger mounting mechanism is provided, according to an embodiment of the present disclosure.

The wireless charger mounting mechanism 100 includes a wireless charger main housing 101 and a twist-lock turning part 102. The twist-lock turning part 102 may serve as a handle, or grip.

The wireless charger main housing 101 includes two or more elastic latches 103-1 and 103-2 for locking and unlocking the wireless charger mounting mechanism 100 into furniture.

Figure 11:
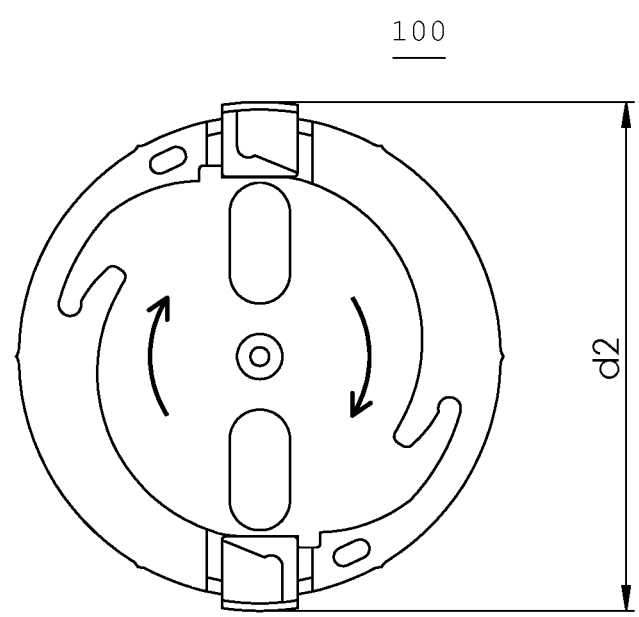
FIG. 11 shows a diagram illustrating a locked position for a wireless charger mounting mechanism, according to an embodiment of the present disclosure.

Referring to FIG. 11, a diagram illustrating a locked position for a wireless charger mounting mechanism is provided, according to an embodiment of the present disclosure.

The wireless charger mounting mechanism 100 is inserted into a furniture mounting hole when in the unlocked position, and then the wireless charger mounting mechanism 100 may be locked. In this way, the wireless charger mounting mechanism 100 may be affixed to the furniture to prevent the wireless charger mounting mechanism 100 from moving around or falling out of the furniture.

In order to attach the wireless charger mounting mechanism 100 to the furniture, the wireless charger mounting mechanism 100 may be placed into a previously drilled mounting hole in the furniture while in the unlocked position. Next, the twist-lock turning part 102 may be twisted in a predetermined direction (e.g., clockwise). When the wireless charger mounting mechanism 100 is twisted in the predetermined direction, the elastic latches 103-1 and 103-2 may protrude in a direction away from the center of the wireless charger mounting mechanism 100, causing the diameter of the wireless charger mounting mechanism 100 to increase. For example, the diameter d1 of the wireless charger mounting mechanism 100 in the unlocked position is less than the diameter d2 of the wireless charger mounting mechanism 100 in the locked position.

By increasing the diameter of the wireless charger mounting mechanism 100 in the locked position, the wireless charger mounting mechanism 100 may be affixed the interior walls of the pre-drilled holes in the furniture. In this way, the wireless charger mounting mechanism 100 may be securely attached to the furniture when placed in the locked position.

Alternatively, the wireless charger mounting mechanism may be attached to the furniture using adhesive, latches, sliders, or clamps to fasten the wireless charger mounting mechanism into an intended position.

Figure 12:
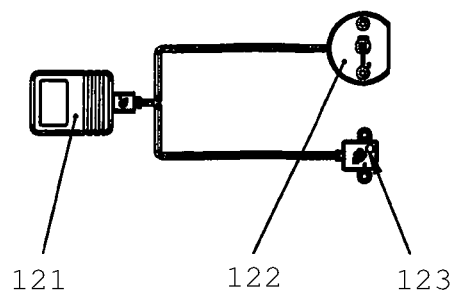
FIG. 12 shows a diagram illustrating a USB splitter and port with a background lighting activating sensor, according to an embodiment of the present disclosure.

Referring to FIG. 12, a diagram illustrating a USB splitter and port with a background lighting activating sensor is provided, according to an embodiment of the present disclosure.

A background lighting activating sensor may include a power supply 121 connected to a USB splitter with a background lighting activating sensor 122 and a USB port 123. The background lighting activating sensor may have an additional USB port included therein.

Figure 13A:
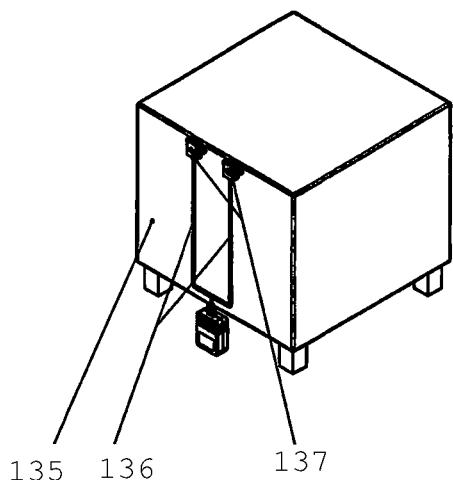
FIG. 13A shows a diagram illustrating a piece of furniture with a background lighting activating sensor, according to an embodiment of the present disclosure.

Referring to FIG. 13A, a diagram illustrating a nightstand with a background lighting activating sensor is provided, according to an embodiment of the present disclosure.

A nightstand 135 with a USB extension cable and power supply device with illumination from USB port background lighting being turned off may be provided. The nightstand 135 may include a USB charging splitter 136 with a built-in background lighting activating sensor. The nightstand 135 may further include USB hubs 137 including USB ports with built-in background light activating sensors.

Figure 13B:
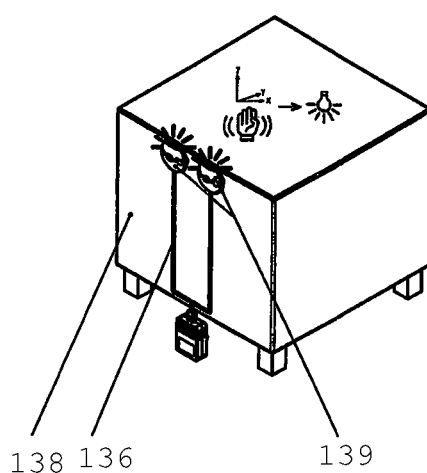
FIG. 13B shows a diagram illustrating a piece of furniture with a background lighting activating sensor, according to an embodiment of the present disclosure.

Referring to FIG. 13B, a diagram illustrating a nightstand with a background lighting activating sensor is provided, according to an embodiment of the present disclosure.

A nightstand 138 with a USB port may have background lighting being activated (i.e., illuminated) by a soft touch or a light shake of the top of the nightstand 138. Accordingly, a USB charging splitter 136 with a built-in background lighting activating sensor may be activated and USB ports 139 with background lighting may illuminate to allow a user to easily locate a port for charging. This can also be done with vibration, sound, etc., and can be installed onto chargers not attached into furniture.

Figure 14A:
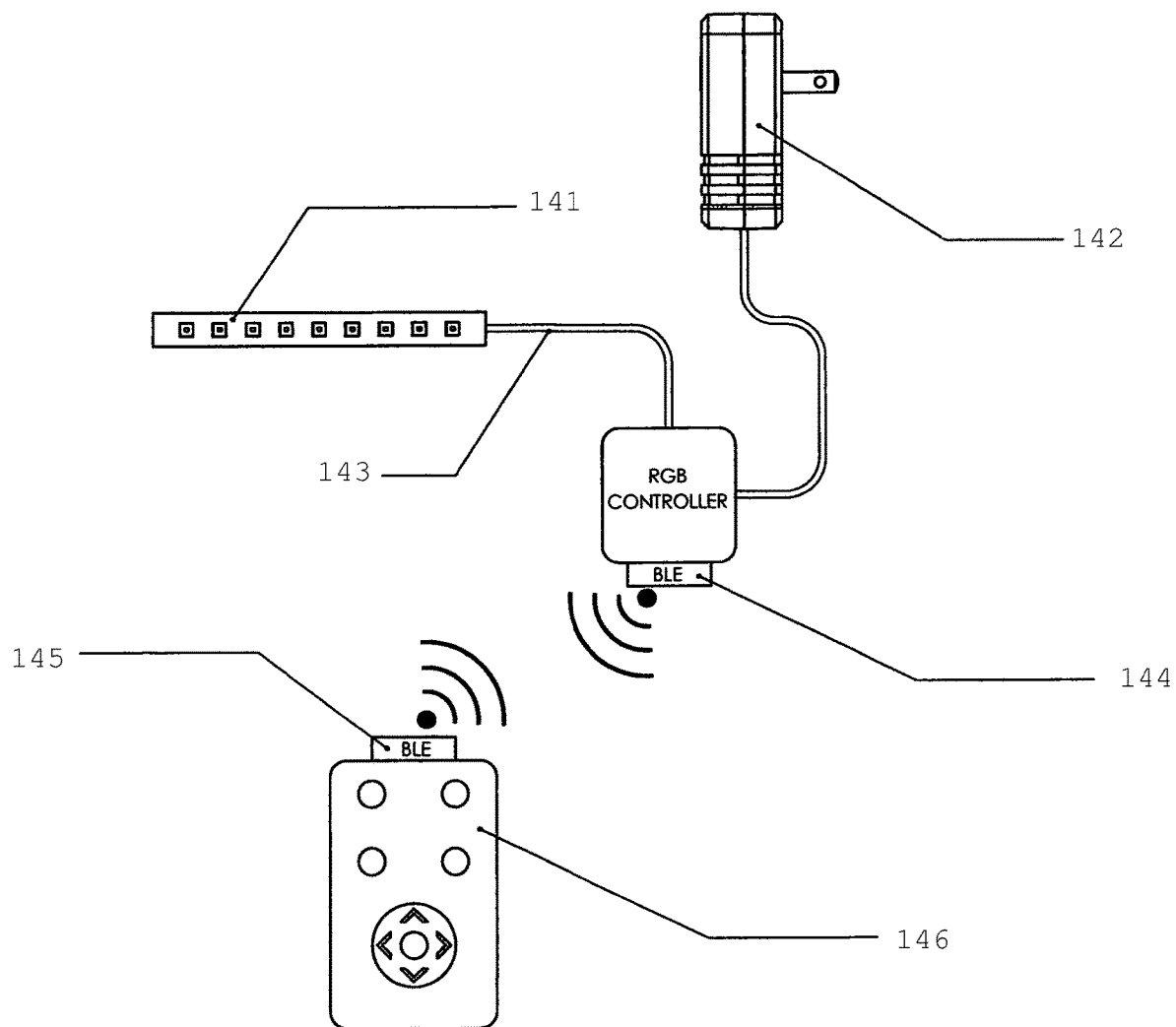
FIG. 14A shows a diagram illustrating an LED background lighting device, according to an embodiment of the present disclosure.

Referring to FIG. 14A, a diagram illustrating an LED background lighting device is provided, according to an embodiment of the present disclosure.

An LED background lighting device may include an LED strip 141. The LED strip 141 may be a red green blue (RGB) LED strip that may display a plurality of colors. The LED strip 141 may comprise a plurality of individual LEDs that may display different or similar colors as each other. For example, all of the LEDs may display a single color (i.e., a yellow color). Alternatively, the LEDs may display a sequence of colors (i.e., yellow, blue, red, yellow, blue, red, etc.).

The LED background lighting device may also include a power supply 142 to supply power to an RGB controller including a wireless Bluetooth module 144. The RGB controller 144 may output a signal to the LED strip 141 through the wire 143, which may connect the RGB controller 144 to the LED strip 141. The signal output by the RBG controller 144 may control the LED lights on the LED strip 141 to display the aforementioned single color, sequence of colors, or pattern of colors.

The RGB controller 144 may be wirelessly controlled by a remote control 146 including a Bluetooth module 145 (i.e., a transceiver). The Bluetooth module 145 may transmit and receive signals from the Bluetooth module of the RGB controller 144. The signals transmitted form the Bluetooth module 145 may control the LED strip 141. For instance, a user may input a preferred lighting sequence into the remote control 146, which may be wirelessly transmitted to the RGB controller 144. Upon receiving the signal, the RGB controller 144 may output the user's inputted information to control a color profile (i.e., a single color, sequence of colors, or pattern of colors) of the LED strip 141.

This configuration of the LED background lighting device may be preferred because it allows a user to wirelessly control and customize the LED background lighting without having to physically touch the LED strip 141 or RGB controller 144, which may be hard to reach since it may be attached to an edge of a piece of furniture or it may be placed in another hard to reach location.

Figure 14B:
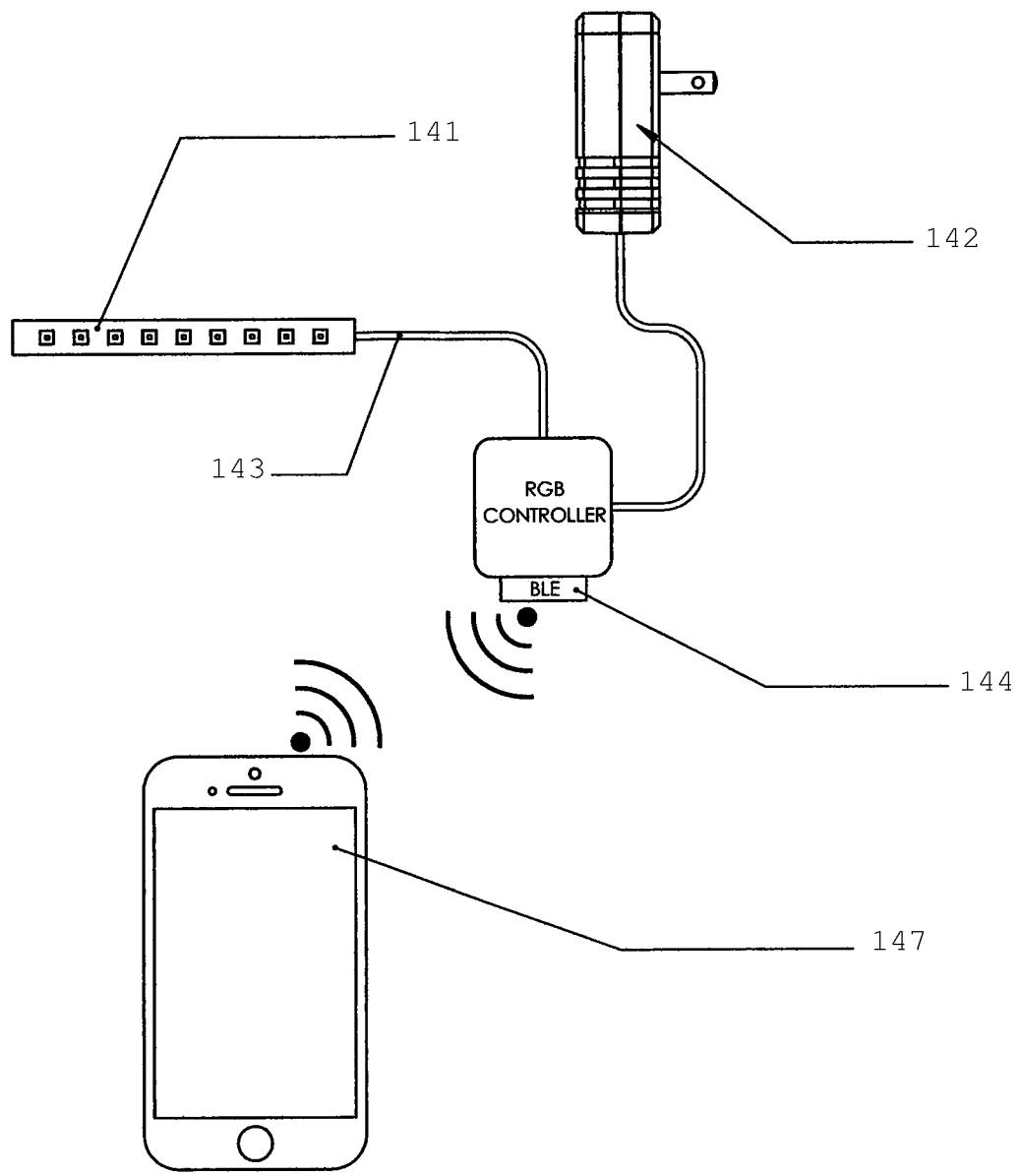
FIG. 14B shows a diagram illustrating an LED background lighting device, according to an embodiment of the present disclosure.

Referring to FIG. 14B, a diagram illustrating an LED background lighting device is provided, according to an embodiment of the present disclosure.

Similar to the background lighting device of FIG. 14A, the LED background lighting device of FIG. 14B may include an LED strip 141, a power supply 142, a wire 143, and an RGB controller with a Bluetooth module 144. The background lighting device of FIG. 14B, however, may further include a mobile phone 147, including a Bluetooth transceiver, to wirelessly transmit a Bluetooth signal to the RGB controller 144. Upon receiving the signal, the RGB controller 144 may output a user's inputted information to control the LED strip 141. For example, an application (app) may be loaded onto the mobile phone 147 to allow a user to input a preferred LED lighting sequence or pattern. For instance, if the user is within wireless range of the RGB controller with the Bluetooth module 144, then the user may choose a preferred lighting that satisfies their current mood or preference by using their mobile device without requiring a standalone remote control.

Additionally, the background lighting device of FIGS. 14A and 14B may be separately attachable/detachable so that it may be placed in a user's preferred location. Further, this feature allows the background lighting device to be replaced without having to also replace the thing (i.e., a piece of furniture) that it is attached to.

Figure 15:
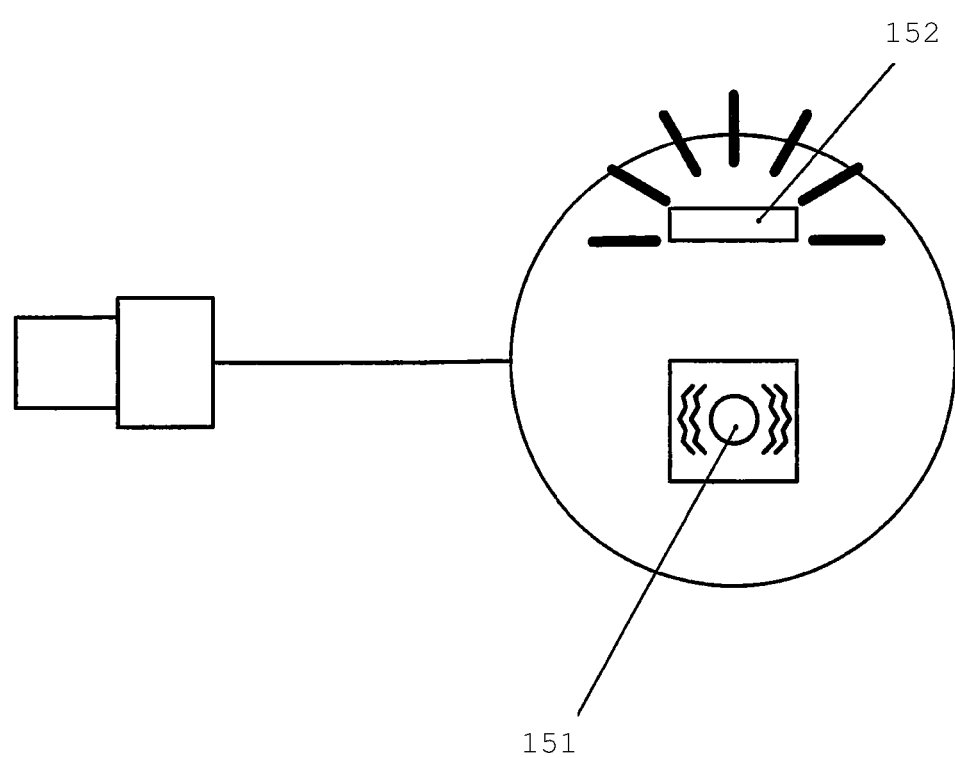
FIG. 15 shows a diagram illustrating a ball-type splitter solution with an enhanced "find me" feature, according to an embodiment of the present disclosure.

Referring to FIG. 15, a diagram illustrating a ball-type splitter solution with an enhanced "find me" feature is provided, according to an embodiment of the present disclosure.

FIG. 15 shows vibration signals 151 generated by a charging device, such as a ball-type splitter, to provide the enhanced "find me" feature.

The "find me" feature is built into the system and may be based on accelerometer data which in real time reads and analyzes accelerations along the X, Y, Z axes. If the read values are greater than threshold values, the system may turn on LED lights and initiate mechanical vibrators so a user can be aided in seeing and feeling vibrations to easily find a splitter by touching, for example, surrounding furniture, a couch, a pillow or other items that are in close proximity to the device. The "find me" feature may run for about 5-10 seconds and may be adjusted according to a user preference.

Further, an LED light 152 may be turned on and off in sync with the vibrations 151 to help find the splitter in poorly lit environments.

Figure 16:
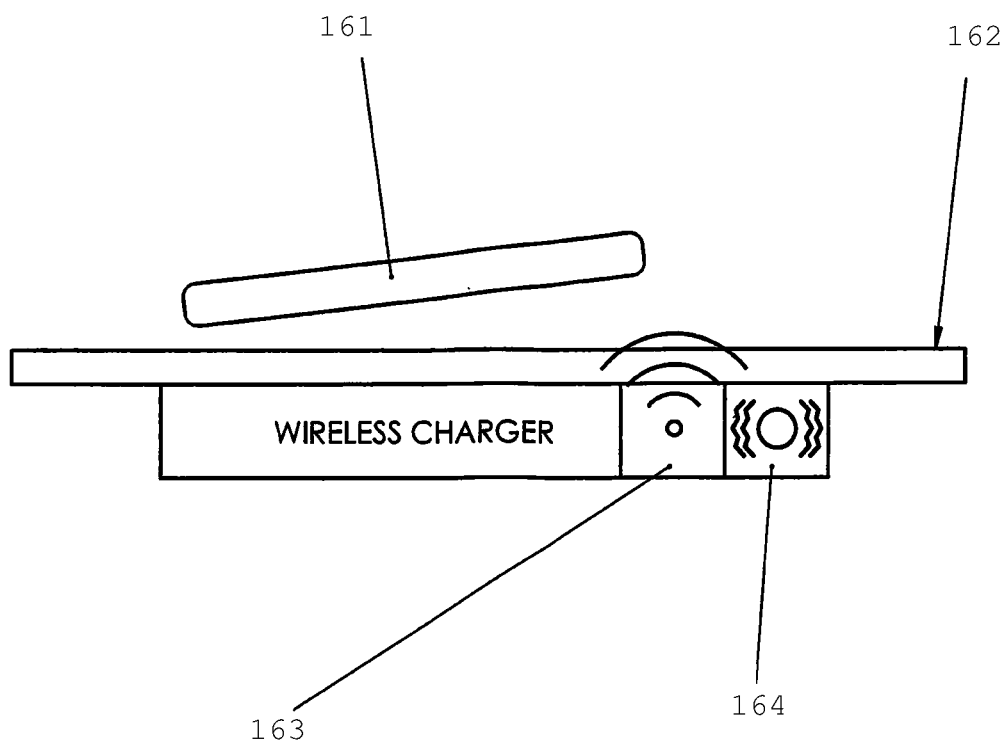
FIG. 16 shows a diagram illustrating a wireless charger mounted beneath a surface of a piece of furniture with an enhanced "find me" feature, according to an embodiment of the present disclosure.

Referring to FIG. 16, a diagram illustrating a wireless charger mounted beneath a surface of a piece of furniture with an enhanced "find me" feature is provided, according to an embodiment of the present disclosure.

It may be difficult to locate a wireless charger solution which is mounted under a furniture top because it may not be visible. Thus, a user may not know where he can put his smartphone or other device to charge it wirelessly. The built-in wireless charger function allows a user to easily find the best place to charge with the best efficiency. The user can move his device 161 on top of furniture 162 and can be informed by the wireless charger where the best position to place his smartphone or other device is. This location information is generated from a beeper 163 and/or a mechanical vibrator 164 so the user can hear the beep and feel the vibration to identify a position for charging. Different types of beep and vibration signals, patterns, or frequencies can be used to inform a user if he is close to or far from a preferred charging location. A preferred charging location may be determined by a charging efficiency that may be determined according to a wireless signal strength, short range wireless communication, or real time charging information of the electronic device.

Figure 17:
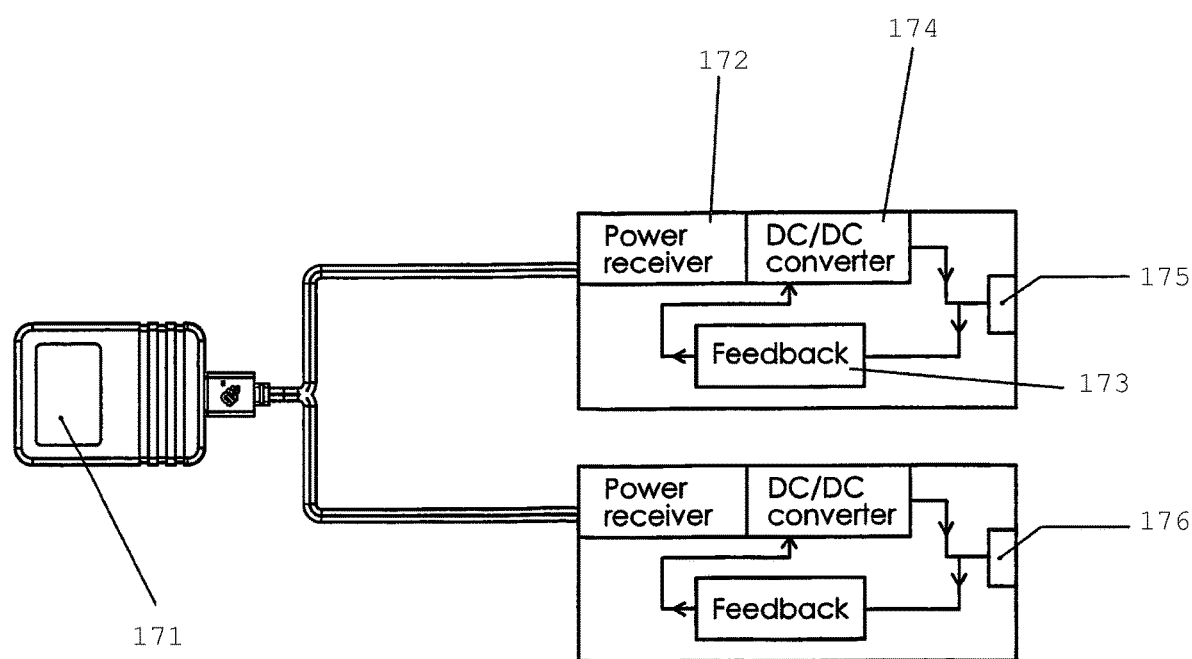
FIG. 17 shows a diagram illustrating a wired charger splitter with built-in intelligent cable compensation and improved output voltage stabilization, according to an embodiment of the present disclosure.

Referring to FIG. 17, a diagram illustrating a wired charger splitter with built-in intelligent cable compensation and improved output voltage stabilization is provided, according to an embodiment of the present disclosure.

FIG. 17 represents a wired charging system based on a complex voltage compensation feature to allow a user to charge his device far from a main power supply. The system uses a standard wall power supply 171, inputting electricity in the range of 15 to 48V DC. A wattage value of this power supply depends on how many splitters can be joined into one place. Preferably, a user does not necessarily require a special power supply with high voltage stabilization. Because higher wall voltage power supplies are more efficient than lower voltage ones, the system may send a higher voltage (up to 48V) through a thin cable to a power receiver 172. At the end of the cable there may be a splitter equipped with a converter and a stabilization system that converts voltage from relatively high voltage values, which are not accepted by smartphones or other devices, to lower voltage values. A feedback system 173 reads an output voltage and sends information to a DC/DC converter 174 (i.e., the DC/DC converter 24 of FIG. 2) to stabilize the output voltage for output ports 175 and 176. In this way, the system achieves high overall efficiency and uses less copper in wires so manufacturers can comply with local environmental regulation and financial considerations.

Figure 18:
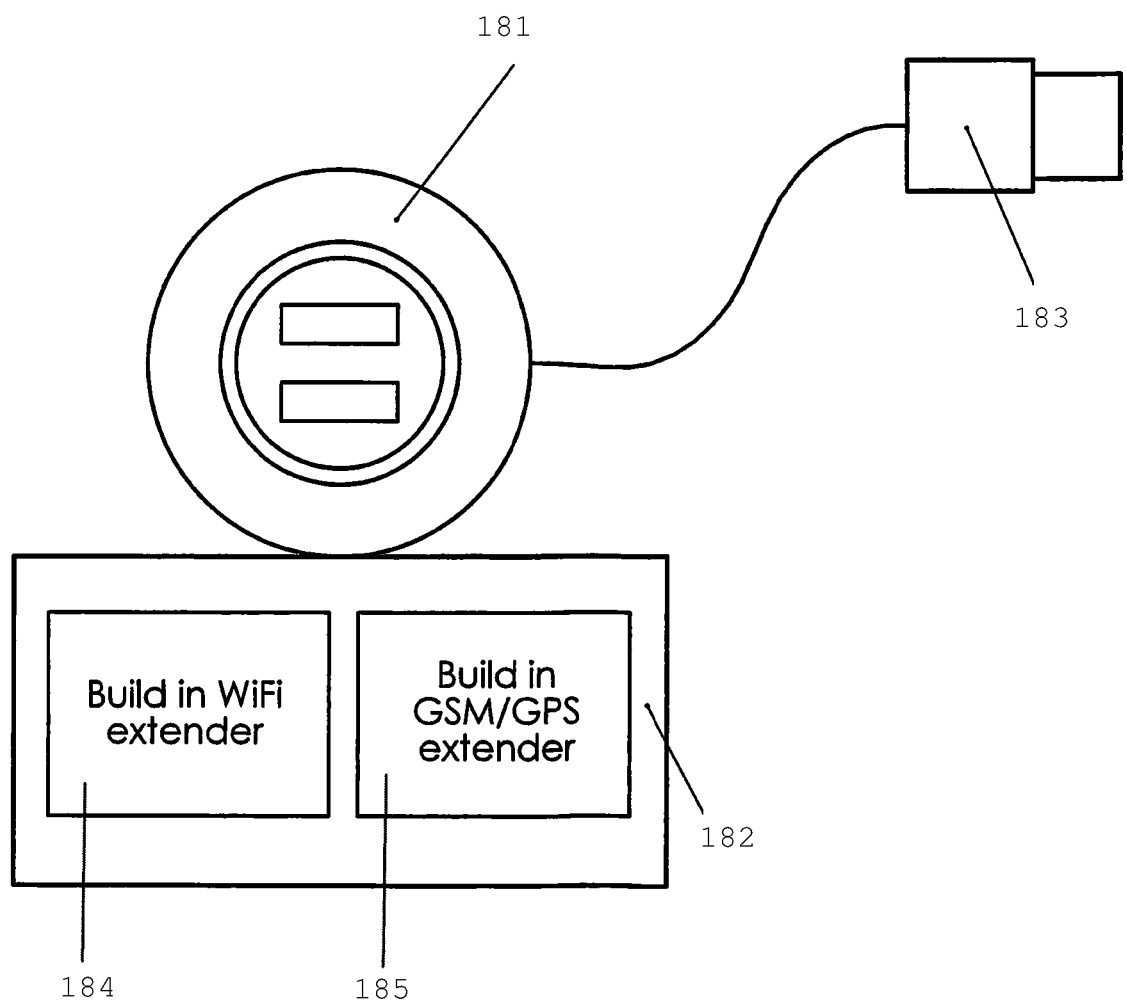
FIG. 18 shows a diagram illustrating a ball-type splitter equipped with a wireless fidelity (Wi-Fi) and global system for mobile (GSM) communications/global positioning system (GPS) signal extender, according to an embodiment of the present disclosure.

Referring to FIG. 18, a diagram illustrating a ball-type splitter equipped with a Wi-Fi and GSM communication/GPS signal extender is provided, according to an embodiment of the present disclosure.

A splitter, such as a ball-type splitter 181, is mounted on a functional base 182 and attached to a USB plug 183. This functional base 182 may be equipped with Wi-Fi 184 and GSM/GPS extenders 185. When located far away from Wi-Fi routers, a signal may be relatively weak. To increase power of these signals, power from the ball-type splitter 181 can be used to receive signals with improved quality over a long distance.

Figure 19:
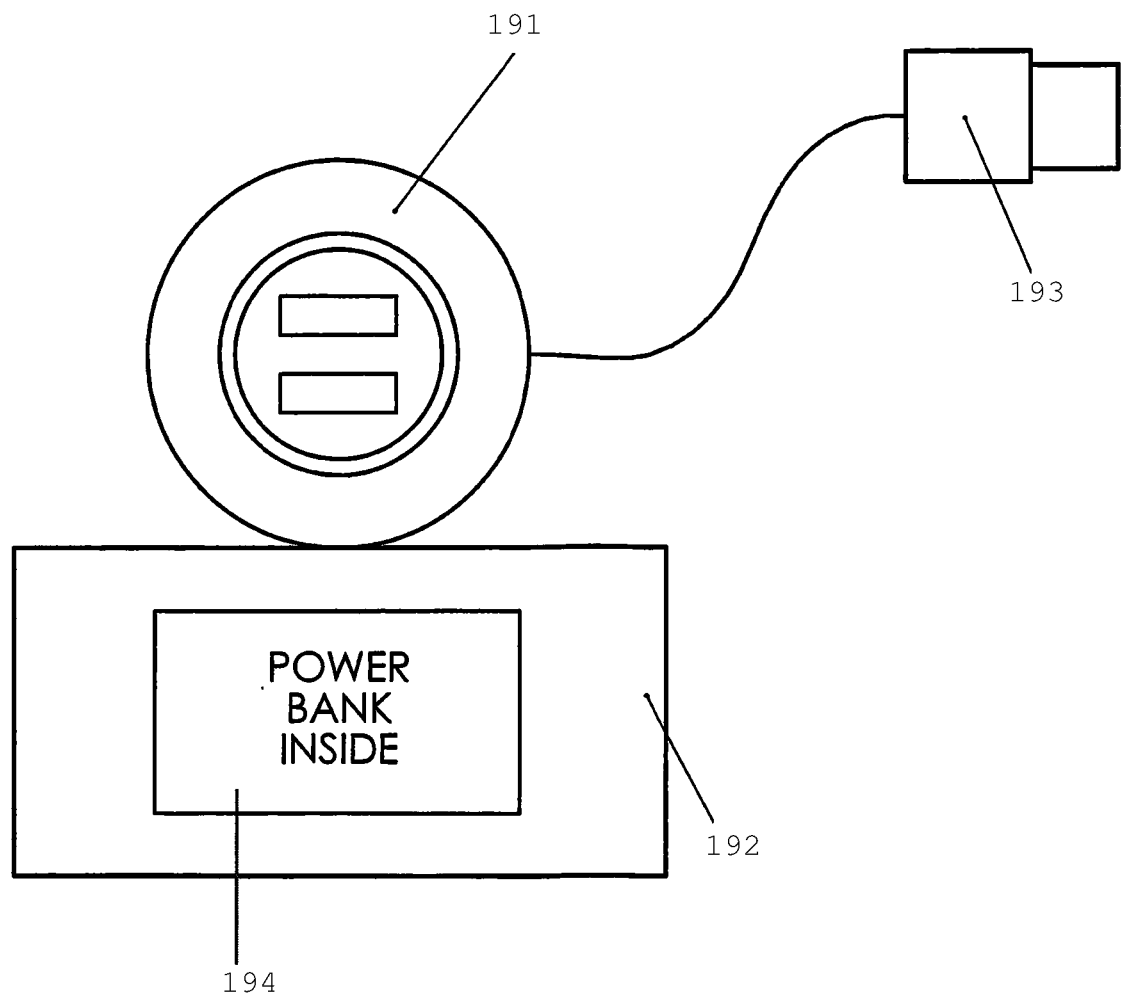
FIG. 19 shows a diagram illustrating a ball-type splitter equipped with an additional power source with a built-in power bank, according to an embodiment of the present disclosure.

Referring to FIG. 19, a diagram illustrating a ball-type splitter equipped with an additional power source with a built-in power bank is provided, according to an embodiment of the present disclosure.

A splitter, such as a ball-type splitter 191, is mounted on a functional base 192 and attached to a USB plug 193. This functional base 192 may be equipped with an internal power source 194, such as a power bank (i.e., a rechargeable battery). There are situations that a main wall power source may be turned off so an external power supply will not be provided to the splitter. The functional base 192 may be equipped with rechargeable batteries and a control system which allows charging of external devices or recharging of the rechargeable batteries built into the functional base 192 when an external power supply is unavailable. A charging or discharging level may be displayed by an LED strip.

Figure 20:
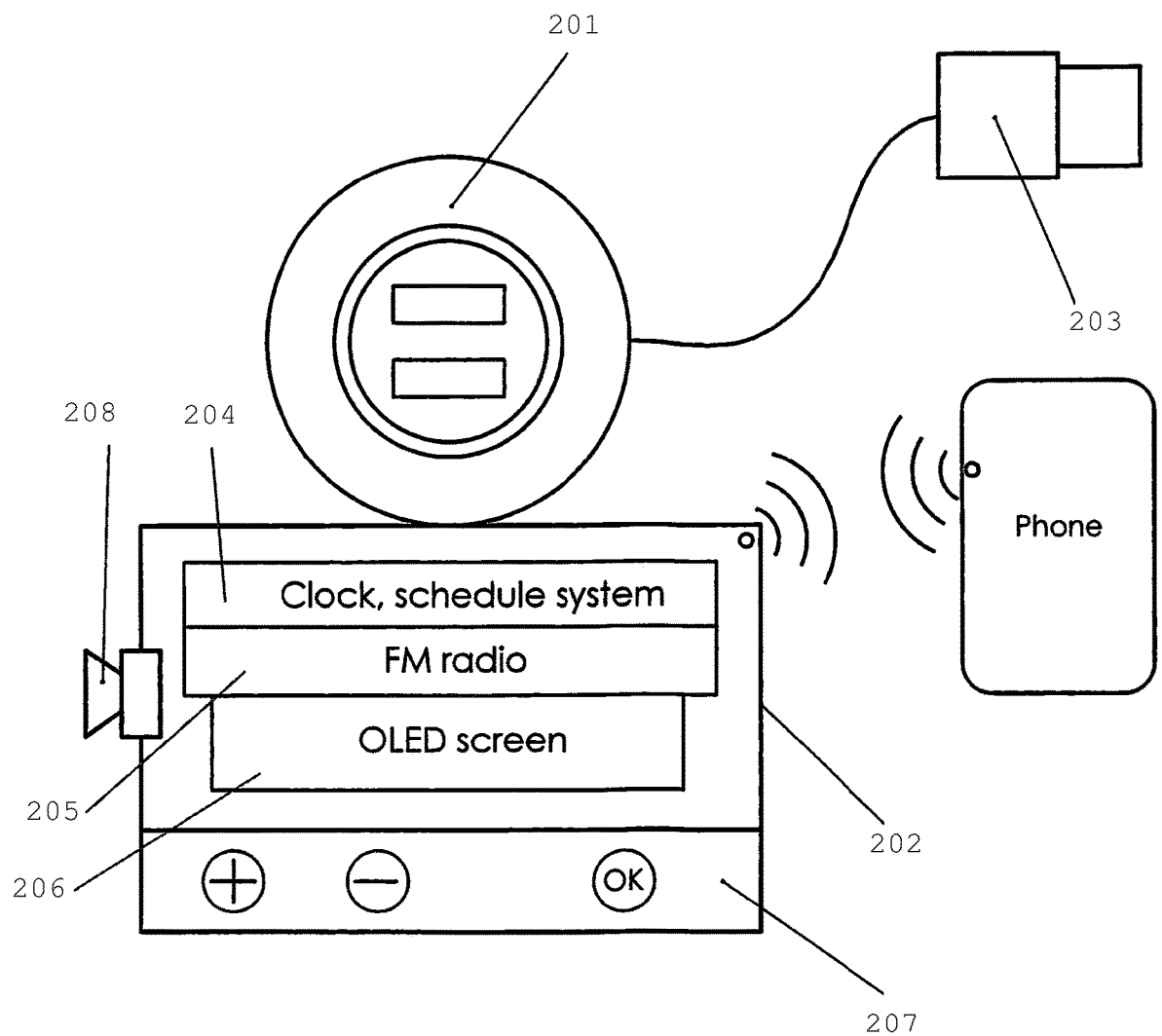
FIG. 20 shows a diagram illustrating a ball-type splitter mounted on a functional base, according to an embodiment of the present disclosure.

Referring to FIG. 20, a diagram illustrating a ball-type splitter mounted on a functional base is provided, according to an embodiment of the present disclosure.

A splitter, such as a ball-type splitter 201 mounted on functional base 202 and attached to a USB plug 203, is provided. This functional base 202 may be equipped with an internal system that includes a timer, an alarm, a scheduler 204, a Wi-Fi transceiver, an FM radio 205, an organic LED (OLED) display 206 and buttons 207. The internal system may communicate with external devices, such as smartphones or other intelligent systems. The OLED display 206 may display general information about time, temperature, and humidity, and may send and receive information about scheduled meetings which have been set by the smartphone. The functional base 202 communicates with the smartphone to exchange information such as urgent reminders and important times and events. The function base 202 may also provide some or all of the information exchanged to the user when the phone is out of an area of the user or is in a silent mode. The user can choose features to be reminded of, displayed on the OLED display 206, and confirmed by a beep via a beeper 208. The buttons 207 can be used to confirm signals, turn on and off the radio, set radio functions, or set an alarm. The system may be powered by the standard power from the splitter or by an external power source.

Figure 21:
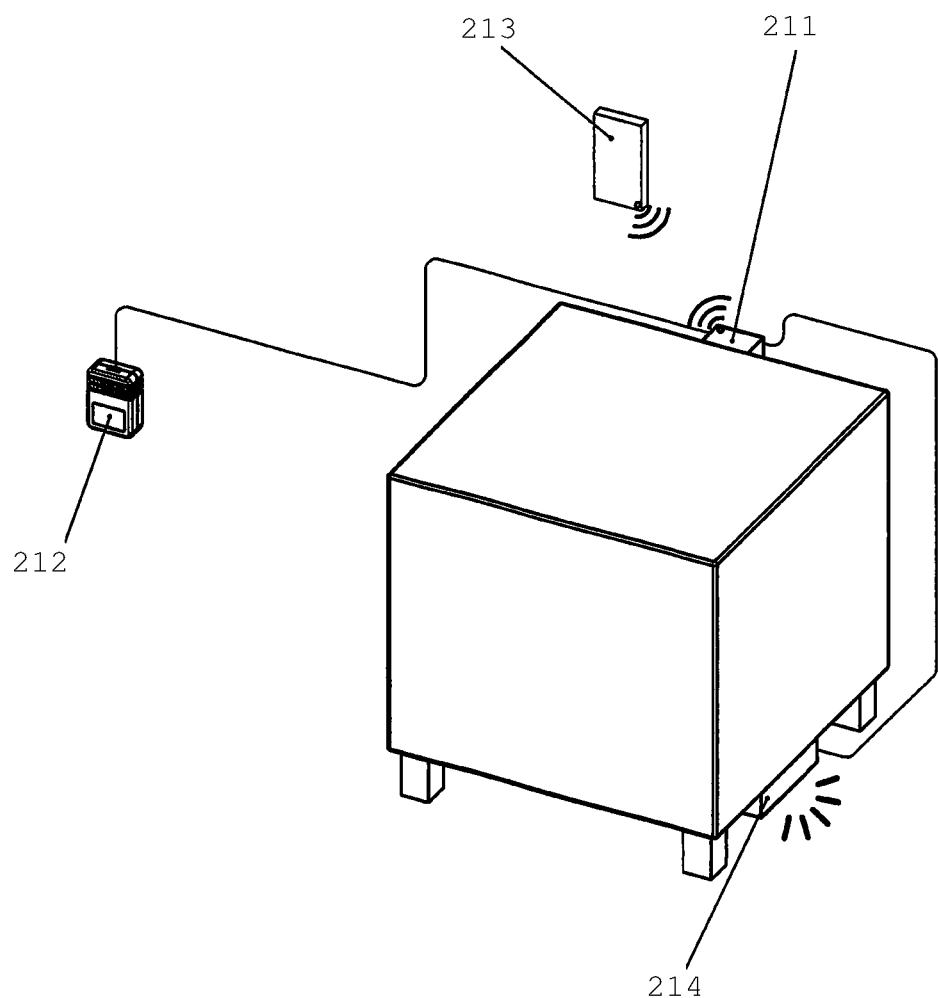
FIG. 21 shows a diagram illustrating a splitter system equipped with a variety of functions, according to an embodiment of the present disclosure.

Referring to FIG. 21, a diagram illustrating a splitter system equipped with a variety of functions is provided, according to an embodiment of the present disclosure.

A splitter system 211 mounted onto a piece of furniture is provided. The system may include a power supply 212 that provides power through a wall outlet or an external battery. The splitter system may wirelessly communicate with an external device 213, such as a smartphone or other intelligent system. An OLED display may provide a light 214 at the base of the furniture and may otherwise communicate information from the smartphone to the user. A user can choose features to be reminded of, displayed on the OLED display and confirmed by a beep. The splitter system may further include a motion and vibration detector to help a user locate the splitter system.

Figure 22:
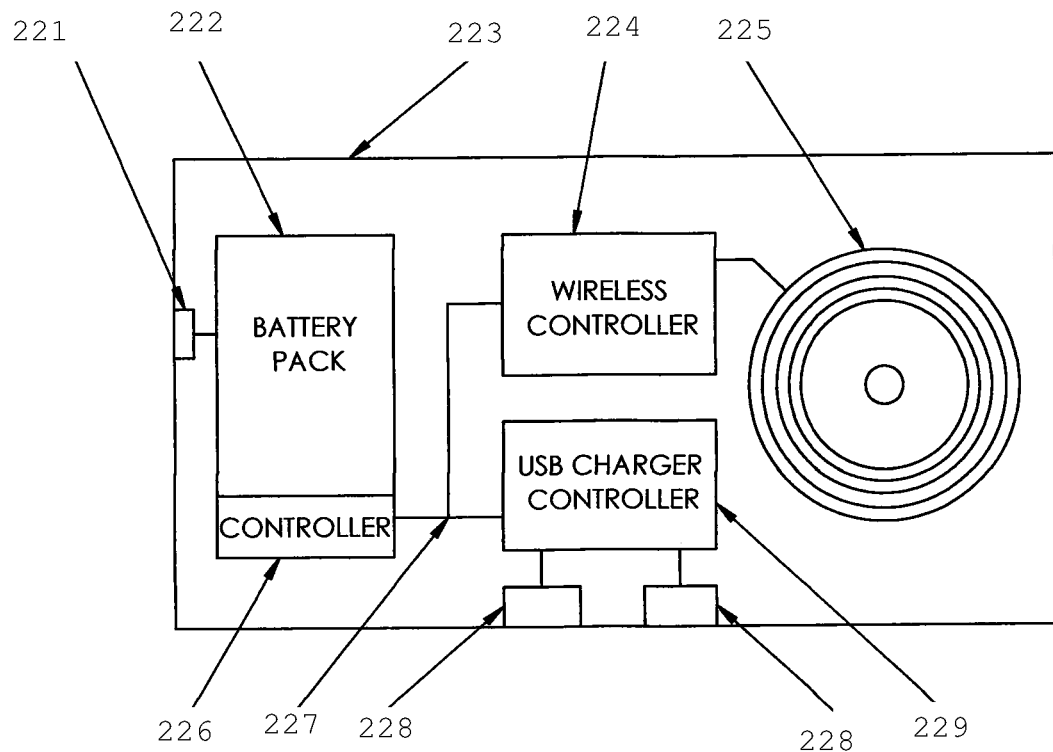
FIG. 22 shows a diagram illustrating a charging solution including a battery pack, according to an embodiment of the present disclosure.

Referring to FIG. 22, a diagram illustrating a charging solution including a battery pack is provided, according to an embodiment of the present disclosure.

The charging solution of FIG. 22 may include a battery pack 222 to supply power for charging external devices. The battery pack 222 may be charged through the charging port 221. A battery pack controller 226 may include an IC to monitor battery pack 222 power levels and output power through the power bus 227.

The charging solution of FIG. 22 may output power both through a wired port and/or wirelessly. For instance, the power bus 227 may connect the battery pack controller 226 to a wireless charger controller 224 and a USB charger controller 229. The wireless charger controller 224 may include an IC and monitor outputting power to a wireless charging coil 225 to wirelessly charge an external device. The USB charger controller 229 may include an IC and monitor outputting power to at least one or more USB charging sockets 228.

The wireless controller 224, the USB charger controller 229, and/or the battery pack controller 226 may include protocols of particular external devices to optimize charging and prevent unintended cycling while a battery is charging.

By including a battery pack 222 for charging external devices inside of a case 223 with the wireless charger 225 and the one or more USB charging sockets 228, it is not necessary to place the charging solution close to a stationary power source (i.e., electrical wall outlet), because the battery pack 222 of the charging solution may be periodically charged to supply power to external devices. In this regard, the charging solution including the battery pack 222 is portable and may be used in places in which access to a wall power supply is limited or restricted.

Figure 23:
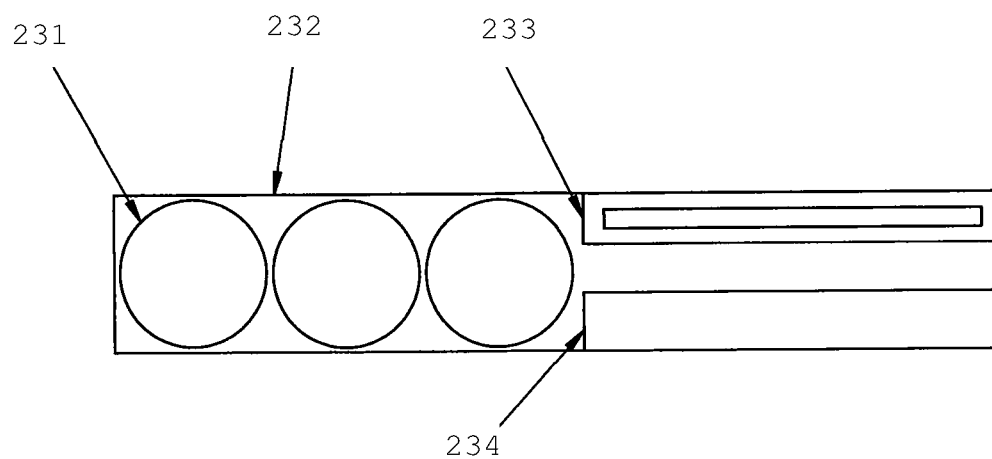
FIG. 23 shows a diagram illustrating a view of the charging solution including a battery pack, according to an embodiment of the present disclosure.

Referring to FIG. 23, a diagram illustrating a view of the charging solution including a battery pack is provided, according to an embodiment of the present disclosure.

The charging solution of FIG. 23 may include a case 232 that houses a battery pack 231, a charging coil 233 and an all controllers case 234. As can be seen in the FIG. 23, the battery pack 231 may occupy a substantial (i.e., more than half) area of the case 232. Further, the charging coil 233 may be situated along an edge of the case 232 to facilitate wireless transmission of power to an external device. The all controllers case 234 may include one or more ICs that provide a substantially similar function to the battery pack controller 226, wireless controller 224, and/or the USB charger controller 229. Thus, the charging solution configuration of FIG. 23 may be useful in creating a compact charging solution.

While the disclosure has been shown and described with reference to a certain preferred embodiment thereof, it will be understood by those skilled in the art that various changes in form and details may be made therein without departing from the spirit and scope of the disclosure.

What is claimed:

1. A smart charging system comprising:
a power supply including a cable compensation integrated circuit (IC);
a power line configured to be connected to the power supply and configured to transmit power to at least one splitter module; and
a functional base equipped with a system to communicate with external devices to exchange urgent reminder information, important time and event information, or information to remind a user when a mobile device is out of an area or is in a silent mode,
wherein the at least one splitter module comprises either:
a universal serial bus (USB) port, or
a wireless charger.

2. The smart charging system of claim 1, wherein the at least one splitter module further comprises a custom IC configured for fast charging and long term preservation of battery life.

3. The smart charging system of claim 1, further comprising:
a data wire line that is configured to connect to the at least one splitter module, wherein the data wire line is separate from the power line and is configured only to transmit data between the at least one splitter module.

4. The smart charging system of claim 1, wherein the at least one splitter module comprises a first USB splitter module having a first light emitting diode (LED) light and a second USB splitter module having a second LED light.

5. The smart charging system of claim 4, wherein the first USB splitter module, and not the second USB splitter module, is configured to control the first LED light of the first USB splitter module and the second LED light of the second USB splitter module.

6. The smart charging system of claim 5, wherein the first USB splitter module is equipped with a microcontroller (MCU) and an accelerometer, and
the second USB splitter module is not equipped with an MCU and an accelerometer.

7. The smart charging system of claim 1, wherein the power supply is a rechargeable battery pack, and the smart charging system further comprises a battery pack controller including an IC to monitor battery pack power levels and output power from the battery pack through the power line.

8. The smart charging system of claim 1, further including a light emitting diode (LED) light included in the USB port that is configured to be illuminated to indicate a status of the USB port.

9. The smart charging system of claim 1, wherein the at least one splitter module is configured to be mounted on furniture.

10. The smart charging system of claim 9, further comprising a background lighting activating sensor that is configured to be illuminated by a soft touch of the furniture, a light shake of a portion of the furniture, or a motion detected in the vicinity of the furniture.

11. The smart charging system of claim 1, further comprising functional base equipped with a wireless fidelity (Wi-Fi), a global system for mobile (GSM), or a global positioning system (GPS) signal extender, wherein a Wi-Fi, GSM, or GPS signal is configured to be received over a long range by using power to increase a strength of the signal.

12. The smart charging system of claim 1, further comprising a functional base equipped with a rechargeable battery, wherein a charging or discharging level is configured to be displayed by a light emitting diode (LED) strip.

13. A wireless smart charging system comprising:
a power supply including a cable compensation integrated circuit (IC);
a wireless and universal serial bus (USB) charging splitter configured to be connected to the power supply;
a wireless charger configured to be connected to the charging splitter; and
a USB extension having a USB port configured to be connected to the charging splitter, the USB extension having a built-in IC for fast charging and long term preservation of battery life,
wherein the wireless smart charging system is configured to analyze a charging efficiency, and if the charging efficiency is greater than a threshold, a mechanical vibration is reverberated or audible notification signals are output to suggest a preferred wireless charging location to a user.

14. The wireless smart charging system of claim 13, wherein the wireless charger is configured to fit into at least one pre-bored hole located on at least one outer edge of furniture.

15. The wireless smart charging system of claim 14, further comprising a locking mechanism that is configured to lock the wireless charger into place by increasing a diameter of the locking mechanism after the wireless charger is fit into the at least one pre-bored hole.

16. The wireless smart charging system of claim 13, further including a feature that is configured to analyze accelerometer data in real time, and if a value of the accelerometer data is greater than a threshold, a light emitting diode (LED) light is illuminated to indicate a status of the USB port.

17. The wireless smart charging system of claim 13, wherein the wireless and USB charging splitter is configured to simultaneously perform wired and wireless charging without decreasing output charging efficiency.

18. A smart charging system comprising:
- a power supply including a cable compensation integrated circuit (IC); and
- a power line connected to the power supply and configured to transmit power to a plurality of splitter modules,
- wherein at least a first one of the plurality of splitter modules comprises a universal serial bus (USB) port and a custom IC configured for fast charging and long term preservation of battery life,
- wherein at least a second one of the plurality of splitter modules comprises a wireless charger and a custom IC configured for fast charging and long term preservation of battery life,
- wherein the plurality of splitter modules is configured to perform cable compensation by communicating information to each other regarding current output charging information to determine an optimal output voltage level for each of the plurality of splitter modules and to adjust an output voltage for charging based on the determination, and
- wherein the smart charging system is configured to analyze a charging efficiency, and if the charging efficiency is greater than a threshold, a mechanical vibration is reverberated or audible notification signals are output to suggest a preferred wireless charging location to a user.

* * * * *